United States Patent
Boumgarten (10) Patent No.: US 9,760,216 B2
(45) Date of Patent: Sep. 12, 2017

(54) TRACKING INPUT TO A MULTI-TOUCH DIGITIZER SYSTEM

(75) Inventor: Eyal Boumgarten, Kiryat-Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 13/985,606

(22) PCT Filed: Feb. 15, 2012

(86) PCT No.: PCT/IL2012/050048
§ 371 (c)(1),
(2), (4) Date: Aug. 15, 2013

(87) PCT Pub. No.: WO2012/111010
PCT Pub. Date: Aug. 23, 2012

(65) Prior Publication Data
US 2013/0328832 A1 Dec. 12, 2013

Related U.S. Application Data

(60) Provisional application No. 61/442,805, filed on Feb. 15, 2011.

(51) Int. Cl.
*G06F 3/044* (2006.01)
*G06F 3/041* (2006.01)
*G06F 3/0488* (2013.01)

(52) U.S. Cl.
CPC .......... *G06F 3/044* (2013.01); *G06F 3/0418* (2013.01); *G06F 3/0488* (2013.01)

(58) Field of Classification Search
CPC ...... G06F 3/0416; G06F 3/041; G06F 3/0488; G06F 3/044; G06F 3/0418;
(Continued)

(56) References Cited

U.S. PATENT DOCUMENTS 6,323,846 B1 * 11/2001 Westerman et al. .......... 345/173
6,690,156 B1    2/2004 Weiner et al.
(Continued)

FOREIGN PATENT DOCUMENTS

EP    1717677    11/2006
EP    1717684    11/2006
(Continued)

OTHER PUBLICATIONS

Communication Pursuant to Article 94(3) EPC Dated Oct. 22, 2014 From the European Patent Office Re. Application No. 12714380.8.
(Continued)

*Primary Examiner* — Nalini Mummalaneni (57) ABSTRACT

A method for identifying intended input to a digitizer sensor includes identifying a plurality of regions of input to a digitizer sensor over a plurality of refresh cycles, classifying each of the plurality regions as one of intended input and unintended input, the classifying performed for each of the plurality of refresh cycles, storing a list of locations of regions classified as unintended input regions, where each entry of the list stored for a pre-defined time period and then subsequently removed from storage and invalidating output obtained from a region classified as a region of intended input, responsive to the region overlapping a location listed in the list of locations classified as unintended input regions.

15 Claims, 7 Drawing Sheets

(58) Field of Classification Search
CPC ............ G06F 3/04883; G06F 3/04886; G06F 3/0412; G06F 1/1643; G06F 3/03547; G06F 2203/04104; G06F 2203/04808; G06F 3/03545
See application file for complete search history.

(56) References Cited

U.S. PATENT DOCUMENTS

| | | | |
|---|---|---|---|
| 7,292,229 | B2 | 11/2007 | Morag et al. |
| 7,372,455 | B2 | 5/2008 | Perski et al. |
| 7,843,439 | B2 | 11/2010 | Perski et al. |
| 8,286,102 | B1* | 10/2012 | Wilensky .................. 715/863 |
| 2002/0015024 | A1 | 2/2002 | Westerman et al. |
| 2004/0095333 | A1 | 5/2004 | Morag et al. |
| 2004/0139368 | A1* | 7/2004 | Austen et al. ................. 714/20 |
| 2004/0155871 | A1 | 8/2004 | Perski et al. |
| 2006/0017709 | A1* | 1/2006 | Okano ................. G06F 3/0421 345/173 |
| 2006/0097991 | A1 | 5/2006 | Hotelling et al. |
| 2007/0062852 | A1 | 3/2007 | Zachut et al. |
| 2007/0285404 | A1 | 12/2007 | Rimon et al. |
| 2008/0158182 | A1 | 7/2008 | Westerman |
| 2008/0297482 | A1 | 12/2008 | Weiss |
| 2009/0095540 | A1* | 4/2009 | Zachut et al. ............. 178/18.03 |
| 2009/0174679 | A1* | 7/2009 | Westerman ......... G06F 3/03547 345/173 |
| 2011/0025613 | A1* | 2/2011 | Hsieh et al. .................. 345/173 |
| 2011/0310040 | A1 | 12/2011 | Ben-Shalom et al. |

FOREIGN PATENT DOCUMENTS

| | | |
|---|---|---|
| EP | 1980935 | 10/2008 |
| JP | 2002-342033 | 11/2002 |
| WO | WO 99/38149 | 7/1999 |
| WO | WO 2007/088939 | 8/2007 |
| WO | WO 2007/089766 | 8/2007 |
| WO | WO 2009/007704 | 1/2009 |
| WO | WO 2009/047759 | 4/2009 |
| WO | WO 2012/111010 | 8/2012 |

OTHER PUBLICATIONS

Official Action Dated Dec. 13, 2013 From the US Patent and Trademark Office U.S. Appl. No. 12/285,460.
Official Action Dated Jan. 5, 2015 From the US Patent and Trademark Office U.S. Appl. No. 12/285,460.
Official Action Dated Jul. 10, 2014 From the US Patent and Trademark Office U.S. Appl. No. 12/285,460.
International Preliminary Report on Patentability Dated Apr. 22, 2010 From the International Bureau of WIPO Re.: Application No. PCT/IL2008/001325.
International Preliminary Report on Patentability Dated Aug. 29, 2013 From the International Bureau of WIPO Re. Application No. PCT/IL2012/050048.
International Search Report and the Written Opinion Dated Jun. 22, 2012 From the International Searching Authority Re. Application No. PCT/IL2012/050048.
International Search Report and the Written Opinion Dated Jul. 31, 2009 From the International Searching Authority Re.: Application No. PCT/IL2008/001325.
Letter Accompaning National Phase Filing Re. Application No. PCT/IL2008/001325 Dated Jun. 24, 2010 to the European Patent Office Re. Application No. 08808121.1.
Official Action Dated Oct. 4, 2011 From the US Patent and Trademark Office U.S. Appl. No. 12/285,460.
Official Action Dated Jun. 5, 2012 From the US Patent and Trademark Office U.S. Appl. No. 12/285,460.
Official Action Dated Dec. 20, 2012 From the US Patent and Trademark Office U.S. Appl. No. 12/285,460.
Official Action Dated Jul. 31, 2013 From the US Patent and Trademark Office U.S. Appl. No. 12/285,460.
Response Dated Jan. 4, 2012 to Official Action of Oct. 4, 2011 From the US Patent and Trademark Office U.S. Appl. No. 12/285,460.
Translation of Notice of Reason for Rejection Dated Dec. 18, 2012 From the Japanese Patent Office Re. Application No. 2010-528523.
Translation of Notice of Reason for Rejection Dated Aug. 21, 2012 From the Japanese Patent Office Re. Application No. 2010-528523.
Rckimoto "SmartSkin: An Infrastructure for Freehand Manipulation on Interactive Surfaces", CHI 2002, Minneapolis, Minnesota, USA, Apr. 20-25, 2002, 4(1): 113-120, 2002.
Official Action Dated Aug. 20, 2015 From the US Patent and Trademark Office U.S. Appl. No. 12/285,460.
Communication Pursuant to Article 94(3) EPC Dated Aug. 5, 2016 From the European Patent Office Re. Application No. 08808121.1.

* cited by examiner

TRACKING INPUT TO A MULTI-TOUCH DIGITIZER SYSTEM

RELATED APPLICATIONS

This application is a National Phase of PCT Patent Application No. PCT/IL2012/050048 having International filing date of Feb. 15, 2012, which claims the benefit of priority under 35 USC §119(e) of U.S. Provisional Application No. 61/442,805 filed on Feb. 15, 2011. The contents of the above applications are all incorporated by reference as if fully set forth herein in their entirety.

FIELD OF THE INVENTION

The present invention relates to multi-touch digitizer systems, and more particularly to tracking intended input to multi-touch digitizer systems in the presence of unintended input.

BACKGROUND OF THE INVENTION

Touch technologies are commonly used as input devices for a variety of products. The usage of touch devices of various kinds is growing sharply due to the emergence of new mobile devices such as Personal Digital Assistants (PDA), tablet PCs and wireless Flat Panel Display (FPD) screen displays. These new devices may not be connected to standard keyboards, mice or like input devices, which are deemed to limit their mobility. Instead there is a tendency to use touch sensitive digitizers of one kind or another. A stylus and/or fingertip may be used as a user touch. One kind of touch sensitive digitizer is a touch screen.

U.S. Patent Application Publication No. 2009-0095540, entitled "Method for Palm Touch Identification in Multi-Touch Digitizing Systems," assigned to N-Trig Ltd., the contents of which is incorporated herein by reference, describes a method for classifying input to a multi-touch sensitive digitizer that is obtained from a body part, as inputs invalid for user interaction and inputs valid for user interaction. The method includes identifying a plurality of discrete regions of input to a digitizer sensor, determining spatial relation between at least two of the regions, and classifying one of the at least two regions as either valid input region or invalid input region based on the spatial relation determined between at least two regions. An invalid region can be input resulting from palm interaction and valid input can be input resulting from a finger tip interaction.

European Patent Publication EP1717684, entitled "Method and apparatus for integrating manual input," the contents of which is incorporated herein by reference, describes an apparatus and methods for simultaneously tracking multiple finger and palm contacts as hands approach, touch, and slide across a proximity-sensing, compliant, and flexible multi-touch surface. Segmentation processing of each proximity image constructs a group of electrodes corresponding to each distinguishable contact and extracts shape, position and surface proximity features for each group. Groups in successive images which correspond to the same hand contact are linked by a persistent path tracker which also detects individual contact touchdown and liftoff.

U.S. Pat. No. 7,843,439, entitled "Touch Detection for a Digitizer" assigned to N-Trig Ltd., the contents of which is incorporated herein by reference, describes a detector for detecting both a stylus and touches by fingers or like body parts on a digitizer sensor. The detector typically includes a digitizer sensor with a grid of sensing conductive lines, a source of oscillating electrical energy at a predetermined frequency, and detection circuitry for detecting a capacitive influence on the sensing conductive line when the oscillating electrical energy is applied, the capacitive influence being interpreted as a touch. The detector is capable of simultaneously detecting multiple finger touches.

U.S. Patent Application Publication No. 2011-0310040, entitled "System and Method for Finger Resolution in Touch Screens," assigned to N-Trig., the contents of which is incorporated herein by reference, describes a system and method for identifying a plurality of interaction with a digitizer sensor. There is described a method for distinguishing a multiple-finger touch zone from touches by other relatively large objects, such as a palm and a method for discriminating between the multiple finger touches.

SUMMARY OF THE INVENTION

An aspect of some embodiments of the present invention is the provision of a method for extracting intended input to a digitizer sensor while additional unintended input is received from a palm, hand, arm, knuckles, ear, and/or other body parts. Optionally, both intended and unintended input to a digitizer sensor may include one or more of input by touch and input by hovering. Typically, the unintended input is obtained from an object that is larger, e.g. substantially larger than an object used for intended input, e.g. finger tip or stylus tip input. According to some embodiments of the present invention, a robustness of known palm rejection methods and/or stability of output obtained from known palm rejection methods are improved by tracking previous locations of palm input and rejecting output sensed in a location that was recently identified as a location that received palm input.

As used herein, the terms 'unintentional input' and 'palm input' refers to input provided by any one or more of a palm, hand, knuckle, ear, wrist and arm, such as may typically occur together with intended input provided with a fingertip and/or hand held object, e.g. a stylus. Optionally, 'unintentional input' and 'palm input' is not accompanied by any intended input.

According to an aspect of some embodiments of the present invention there is provided a method for identifying intended input to a digitizer sensor, the method comprising: identifying a plurality of regions of input to a digitizer sensor over a plurality of refresh cycles, classifying each of the plurality regions as one of intended input and unintended input, wherein the classifying is performed for each of the plurality of refresh cycles, storing a list of locations of regions classified as unintended input regions, wherein each entry of the list is stored for a pre-defined time period and then subsequently removed from storage, and invalidating output obtained from a region classified as a region of intended input, responsive to the region overlapping a location listed in the list of locations classified as unintended input regions.

Optionally, the unintended input is input from at least one of a palm, hand, wrist, ear and knuckle.

Optionally, the method includes invalidating output obtained from regions classified as unintended input.

Optionally, the method includes validating output obtained from regions classified as regions of intended input responsive to the regions being displaced from locations listed in the list of locations classified as unintended input regions.

Optionally, the method includes reporting a coordinate of the output to a host associated with the digitizer sensor responsive to that output being validated.

Optionally, the method includes re-initializing the pre-defined time period for storing an entry of the list, responsive to that region of the entry being overlapped by a region classified as a region of intended input.

Optionally, the plurality of regions of input to the digitizer sensor is identified by segmenting the output obtained from the digitizer sensor into a plurality of discrete regions.

Optionally, each of the plurality of regions is defined as a rectangular region.

Optionally, each entry on the list of locations stored includes at least one parameter defining a spatial extent of a region listed.

Optionally, the pre-defined time period is between 0.25 seconds and 2 seconds.

Optionally, each entry on the list of locations stored includes a time stamp indicating a time in which the location was added to the list.

Optionally, a region is classified as a palm input region responsive to the region encompassing an area larger than 500 mm2.

Optionally, a region is classified as a palm input region responsive to the region encompassing an area larger than 1000 mm2.

According to an aspect of some embodiments of the present invention there is provided a digitizer system operative to identify intended input to a digitizer sensor comprising: a grid based capacitive sensor operative to detect presence of a plurality of capacitive objects positioned over the sensor, a processing unit operative to: detect a plurality of regions of input to a digitizer sensor over a plurality of refresh cycles, and classify each of the plurality regions as one of intended input and unintended input, wherein the classifying is performed for each of the plurality of refresh cycles, a memory unit operative to store a list of locations of regions classified as unintended input regions, a controller operative to: invalidating output obtained from a region classified as a region of intended input responsive to the region overlapping a location listed in the list of locations classified as unintended input regions, and to remove a entry on the list responsive to lapse of a pre-defined time period of that entry since the entry was added to the list.

Optionally, the unintended input is input from at least one of a palm, hand, wrist, ear, and knuckle.

Optionally, the controller is operative to invalidate output obtained from regions classified as unintended input regions.

Optionally, the controller is operative to validate output obtained from regions classified as regions of intended input responsive to the regions being displaced from locations listed in the list of locations classified as unintended input regions.

Optionally, the controller is operative to report a coordinate of output to a host associated with the digitizer sensor, responsive to the output being validated.

Optionally, the controller is operative to re-initializing the pre-defined time period for storing the location of a region responsive to that region being overlapped by a region classified as a region of intended input.

Optionally, the processor is operative to define each of the plurality of regions as a rectangular region bounding in the region.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention relates to multi-touch digitizer systems, and more particularly to tracking intended input to a multi-touch digitizer systems in the presence of unintended inputs.

Digitizer systems, e.g. touch screens are typically designed to allow a user to provide input to an electronic device in a natural and versatile way. Known systems allow one or more users to provide input by touching and/or hovering over a touch screen with one or more finger tips and/or styluses. It is often natural for a user to rest a palm (and/or another part of the hand such as the knuckles) on the touch screen and to move the palm and or shift the palm's weight while providing an intended input with a finger tip and/or a stylus. As the palm rests and moves on the touch screen, unintentional input from the palm is received by the digitizer sensor. Palm input may also be accompanied by artifact regions that are not actual touch regions but that typically appear around palm touch or other large area touch regions. Regions of palm input may have various sizes, shapes, and also may result in variable levels of output. The size, shape and amplitude of the output obtained due to palm may also vary as the hand moves during user interaction with the touch screen. Variability in the type of input that may be obtained by the palm and/or other parts of the hand or arm makes it difficult to successfully differentiate between intended input e.g. from a finger tip and unintentional input, e.g. from the palm. In multi-touch applications, the difficulty in differentiating between intended input and unintended input from the palm is even more challenging since the number of expected intended inputs is not always known.

Methods for identifying and invalidating output obtained from a region of palm input have been proposed. Typically, known methods are designed to identify a palm input region on a per-sample basis based on characteristics of signals received from the digitizer sensor. Optionally, for each refresh cycle, output obtained over that refresh cycle is processed to identify potential region of palm input. The present inventor has found that when performing palm rejection on a per refresh cycle basis, falsely identified locations of intended user input may appear and then disappear in an erratic manner over a course of interaction with the digitizer sensor. The present inventor has found that these erratic appearances may be reduced by considering locations of palm input identified in previous refresh cycle(s) and the time it would take to remove the palm, so that an intended input may be provided in that same location. In some exemplary embodiments, methods for identifying and invalidating output obtained from palm input region as described herein, may provide for reducing the number of false negatives, e.g. the number of palm input falsely identified as intended input typically obtained by known palm rejection algorithms.

The present inventor has found that the time a user will typically take to remove a palm (or other part of the hand providing unintended input) from a specific region on the touch screen and then provide intended input, e.g. finger tip input in that specific region can be estimated and is typically extended over a plurality of refresh cycles of the touch screen, e.g. 10-200 refresh cycles. The present inventor has found that a user may typically take at least 0.25 seconds to 2 seconds to remove a palm and then provide input in the palm region. According to some embodiments of the present invention, this insight and/or information is used to improve an ability of a touch system to correctly invalidate output obtained from unintentional input provided by a palm. Optionally, a minimal delay between palm removal and fingertip touch in a same region is determined based on experimental results. According to some embodiments of the present invention, once a region is identified as a palm region, output obtained within that region is invalidated for a pre-defined period after the last refresh cycle in which the region is identified as a palm region. Optionally, for each instance and/or for each refresh cycle in which a palm is identified, a time stamp for determining lapse of the pre-defined period is reset. According to some embodiments of the present invention, if no palm has been identified in the invalid region for the pre-defined period, the region is validated again.

Figure 1:
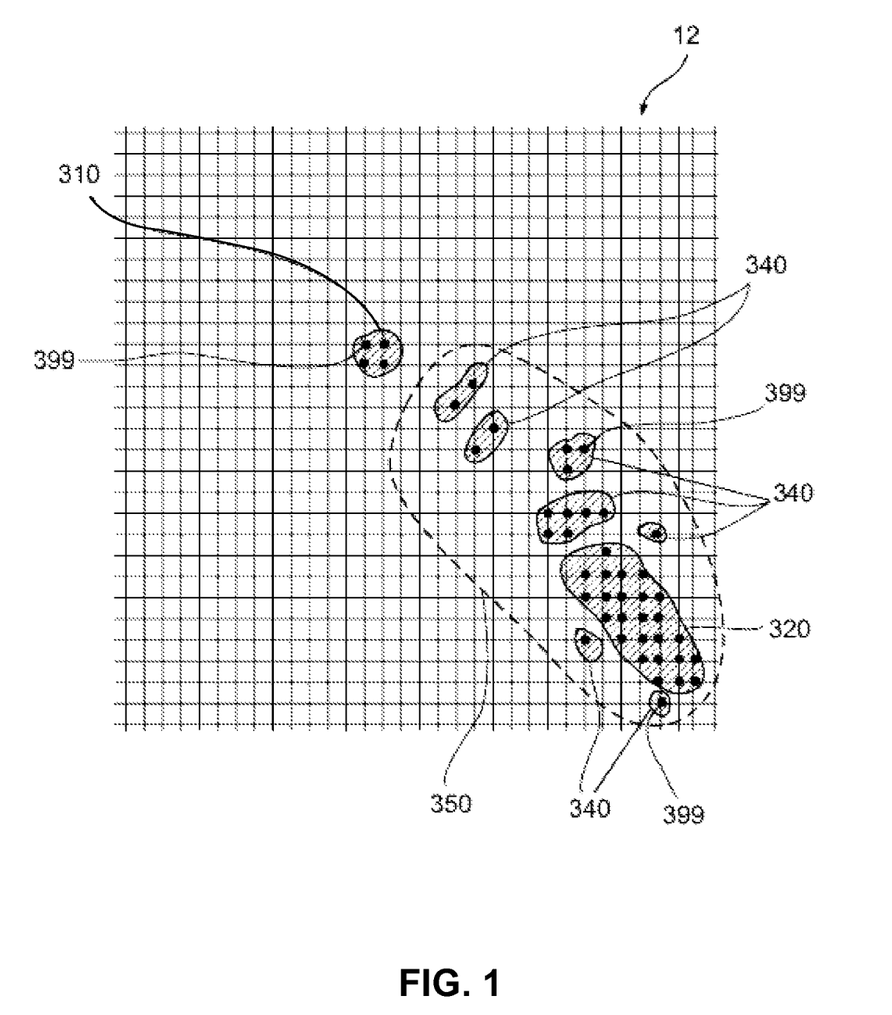
FIG. 1 is showing a schematic illustration of exemplary output detected on a grid based capacitive sensor in response to a hand resting on the sensor while input is provided with a fingertip in accordance with some embodiments of the present invention.

Reference is first made to FIG. 1 showing a schematic illustration of exemplary output detected on a grid based capacitive sensor in response to a hand resting on the sensor while input is provided with a fingertip in accordance with some embodiments of the present invention. Typically, for grid based capacitive sensors, output is detected at junctions 399 formed from crossing conductive lines of sensor 12. It is noted that although FIG. 1 shows output from a grid based capacitive sensor, the methods and system described herein are not necessarily limited to grid based capacitive sensors. The system and methods described herein may also be applicable to other digitized systems and touch screens known in the art, depending on their construction, and are especially applicable to systems capable of multi-touch detection.

Optionally, a user may rest a palm on the digitizer sensor 12 while using a fingertip to interact with digitizer sensor 12. According to some embodiments of the present invention, output detected on digitizer sensor 12 includes output 310 obtained from a fingertip, e.g. intended input as well as output 350 obtained from a palm, e.g. unintended input. Typically, output 350 from the palm is detected over one or more large area regions 320 as well as at least one small area region 340. Small area regions 340 typically result from a three dimensional structure of the hand, e.g. knuckles, and/or from artifact signals that typically occur around a large area of input. Output from a fingertip, typically includes one small area region 310, e.g. one small area region 310 per finger.

Although output for only one palm and one fingertip is shown in FIG. 1, it is noted that more than one finger tip or more than one palm may provide input to digitizer sensor 12 at a same time and output obtained may then include a plurality of areas of palm output 350 and/or a plurality of fingertip outputs 310.

Typically as the fingertip and hand move during user interaction, parameters such as spatial parameters of the regions, e.g. size, shape, number and location of regions 310 associated with the fingertip input as well as regions 320 and 340 associated with palm input are altered. Changes in palm output 350 may occur for example due to lifting of the finger tip, e.g. during a tapping movement, due to movement of the fingertip along a plane of digitizer sensor 12, e.g. while drawing, and/or due to adjusting the palm to a comfortable position. Changes in regions associated with palm output

350 may be difficult to predict. The present inventor has found that over a course of user interaction, one or more small area regions 320 associated with the palm may occasionally be mistaken for intended input, e.g. input from a fingertip. When identifying palm input on a per refresh cycle basis, these falsely identified intended inputs may occur in a sporadic atypical manner. An input region may be identified in one refresh cycle, may disappear in a subsequent refresh cycle and then may appear and then quickly disappear somewhere. Reporting such sporadic, transient outputs to a host and/or operating system and/or application associated with the digitizer sensor, may lead to erratic behavior of the host. According to some embodiments of the present invention, these sporadic appearances of output are reduced by recording locations of palm input, e.g. regions 320 and 340 for a pre-defined period after a palm input is detected and invalidating any output obtained from that location during the pre-defined period.

Figure 2:
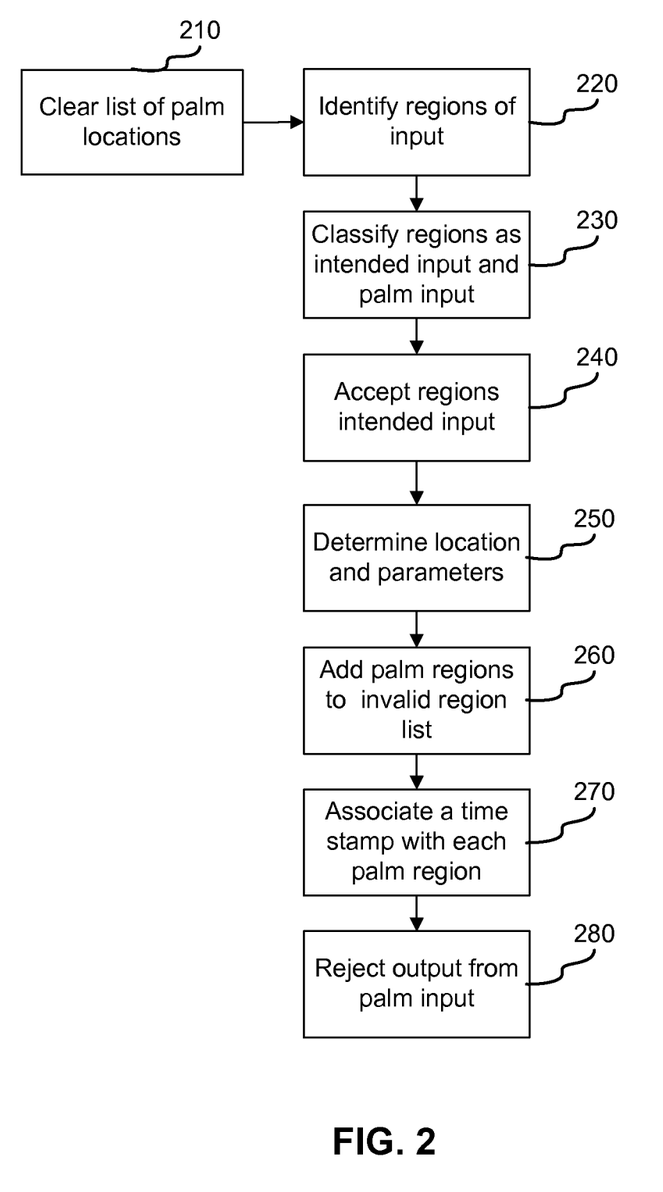
FIG. 2 is a simplified flow chart of an exemplary method for identifying invalid output obtained from a palm, hand, ear, wrist and/or arm during a refresh cycle in which output is initially detected in accordance with some embodiments of the present.

Reference is now made to FIG. 2 showing a simplified flow chart of an exemplary method for tracking detected palm input regions in accordance with some embodiments of the present invention. In some exemplary embodiments, during startup of the digitizer system and/or after a pre-defined period has lapsed with no input provided to the digitizer system, a record of previous locations of the palm is deleted and/or removed from memory (block 210). Optionally, after a predetermined period, e.g., a period of between 1-20 seconds of no input provided to the digitizer system, a record of previous locations of palm input is removed. According to some embodiments of the present invention, output obtained from the digitizer sensor is processed to identify discrete regions of input to the digitizer sensor, e.g. regions 310, 320 and 340 (block 220). In some exemplary embodiments, segmentation is performed on the output to identify the discrete regions of input. Exemplary methods for segmenting output into a plurality of discrete input regions are discussed in more detail herein below.

According to some embodiment of the present invention, identified regions of input are classified as one of intended input and palm input (block 230). Optionally, a palm rejection algorithm is used to classify the regions of input. Typically, classification is based on analysis of outputs obtained from a current refresh cycle. In some exemplary embodiments, classification is based on at least one of size, shape and/or location of the input region. Optionally proximity between the regions input is determined and used to differentiate between intended input and input obtained from the palm. In some exemplary embodiments, classification methods described in incorporated U.S. Patent Application Publication No. 2009-0095540 are applied to classify regions as one of intended input region and palm input region. An optional classification method that may be used with some embodiments of the present invention is described in reference to FIG. 5 herein below.

According to some embodiments of the present invention, when no information regarding a previous location of a palm is available, outputs from all regions of input classified as intended input regions are validated, e.g. reported to a host associated with the digitizer sensor and/or tracked (block 240). Typically, a single coordinate point for each validated region is forwarded and/or reported to the host and/or tracked. Optionally, a coordinate of a center of mass and/or of a highest detect output in the input region is reported.

According to some embodiments of the present invention, one or more parameters of each of the identified palm input regions 320 and 340 are determined (block 250). Optionally the one or more parameters define one or more of location, size, orientation and/or shape of the palm input region. According to some embodiments of the present invention, each identified palm input region is recorded in memory, e.g. in a list or table (block 26). Optionally, parameters of a single area encompassing a plurality of identified palm regions, e.g. region 350 (FIG. 1) is additionally and/or alternatively determined and recorded in memory. Optionally, parameters of a pre-defined shape bounding a palm input region and/or an encompassing region is defined and recorded and recorded.

According to some embodiments of the present invention, a time stamp marking a time in which the palm region was identified is recorded for each of the palm regions identified (block 270) and/or for the encompassing region identified. Optionally, a counter is initiated and used to track time and/or number of refresh cycles since a specific palm region was identified. According to some embodiments of the present invention, outputs from a palm input region are not transmitted to the host and/or are defined as unintended input that is to be ignored by the host.

Figure 3:
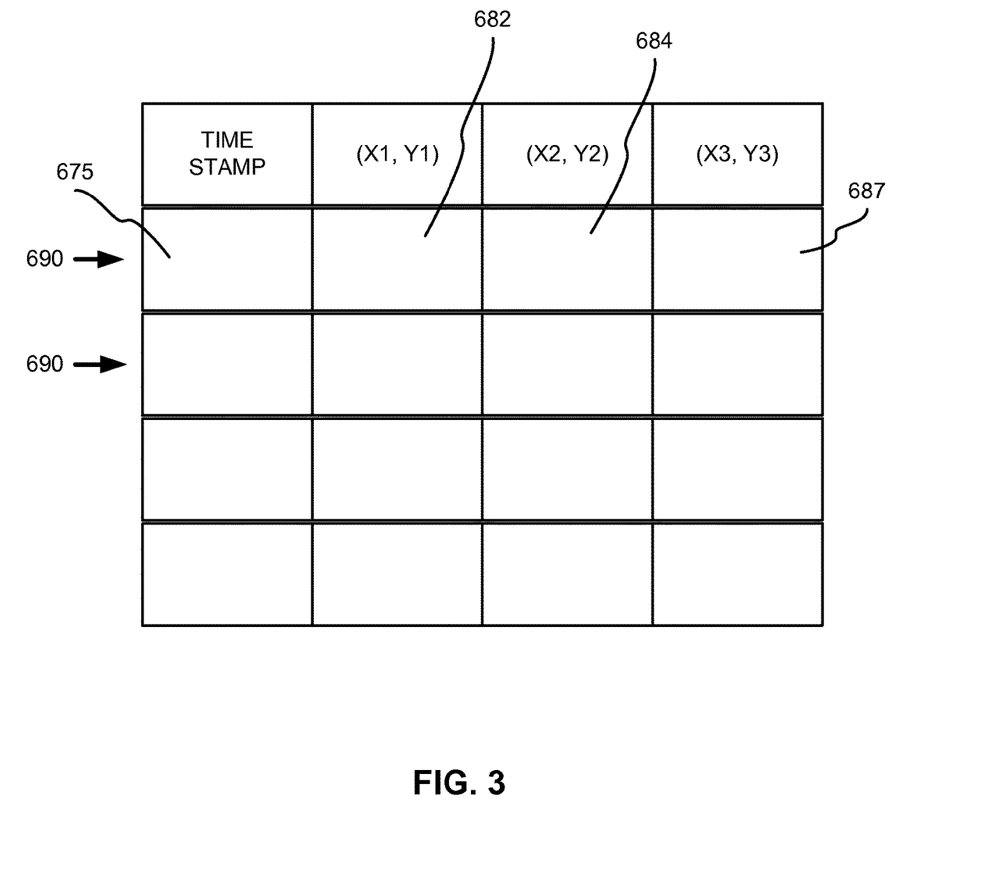
FIG. 3 is an exemplary table storing a list of invalid regions in accordance with some embodiments of the present invention.

Reference is now made to FIG. 3 showing an exemplary table storing a list of invalid regions in accordance with some embodiments of the present invention. According to some embodiments of the present invention, input regions classified as palm input regions are recorded in a table, list or data structure 700. In some exemplary embodiments, each invalid region is defined by a bounding rectangle. Optionally, other pre-defined shapes are used, e.g. ellipse. Alternatively, unique shapes are determined for each input region detected. According to some embodiments of the present invention, one or more parameters are stored for defining a location and an extent of a recorded region. Optionally, when a region is defined by a bounding rectangle, positioning, size and orientation of each invalid region on the list is defined by recording coordinates of any of three vertices of the bounding rectangle, e.g. coordinates 682, 684 and 687. In some embodiments, only two vertices of the bounding rectangle may be recorded. According to some embodiments of the present invention, a time stamp 675 is recorded for each entry of a palm input region. Typically, during a course of user interaction, an entry 690 may be deleted, added and/or time stamp 675 of entry 690 may be updated, e.g. re-initialized. Optionally, at a start of every refresh cycle, any entry 690 including a time stamp older than a pre-defined time period is deleted from list 700.

Figure 4:
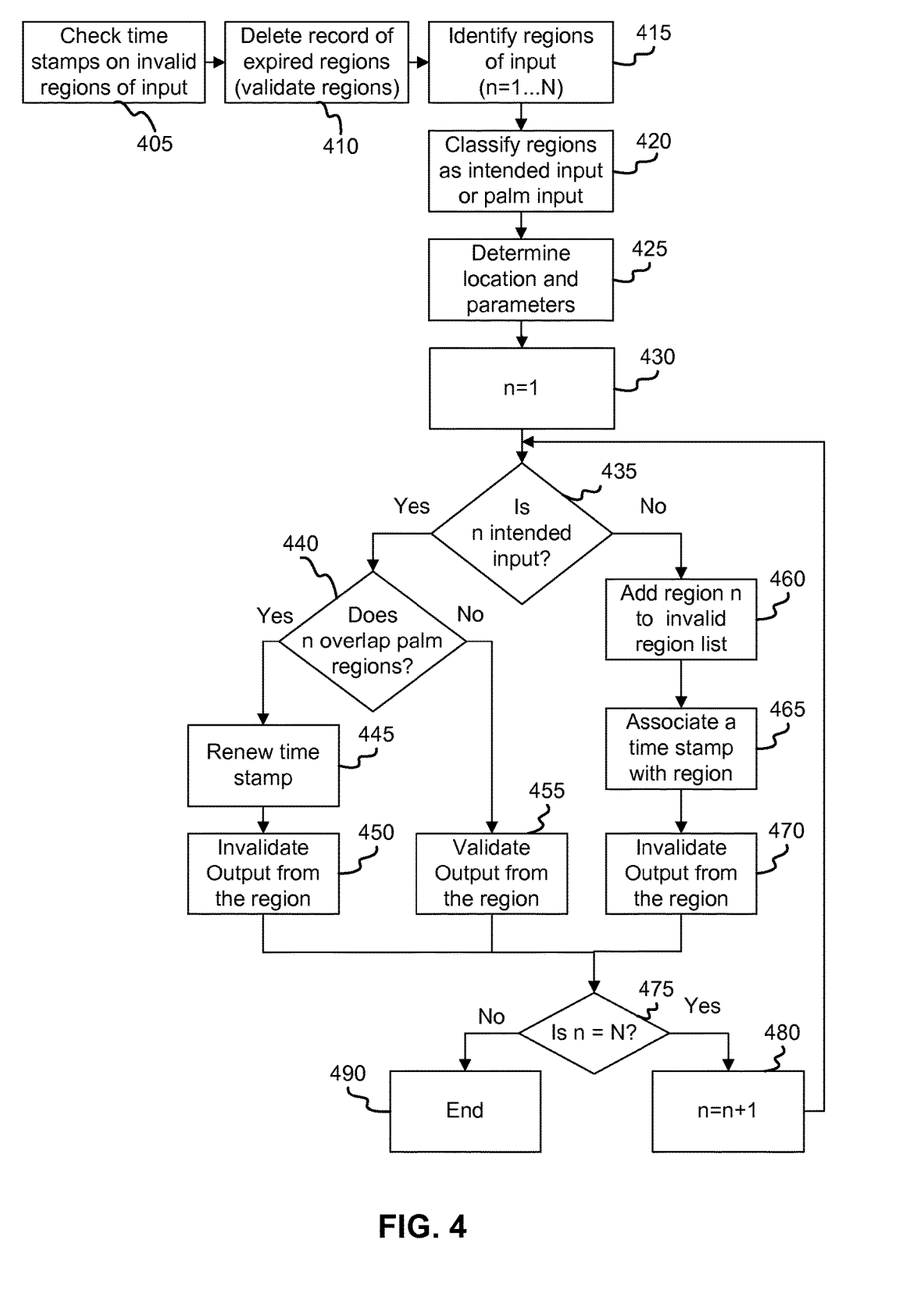
FIG. 4 a simplified flow chart of an exemplary method for invalidating output obtained from a region previously identified as a palm input region in accordance with some embodiments of the present.

Reference is now made to FIG. 4 showing a simplified flow chart of an exemplary method for invalidating output obtained from a region previously identified as a palm input region in accordance with some embodiments of the present. According to some embodiments of the present invention, during ongoing interaction with a digitizer sensor, time stamps on a recorded list of invalid regions are monitored (block 405) and a list and/or recording of invalid regions is updated. In some exemplary embodiment, any region associated with a time stamp beyond a threshold time is removed from the list (block 410). Typically, an invalid region is maintained on record and/or on the list for a period of between 0.25 seconds to 2 seconds and is then removed, unless its timestamp is updated and/or re-initialized.

According to some embodiments of the present invention, output obtained from the digitizer sensor is processed to identify discrete regions of input to the digitizer sensor, e.g. regions 310, 320 and 340 (block 415). In some exemplary embodiments, segmentation is performed on the output to identify the discrete regions of input. Optionally, an encompassing region of output 350 including a plurality of discrete regions of unintended touch is identified. According to some embodiment of the present invention, identified regions of input are classified as one of intended input and unintended input, such as palm input (block 230). Exemplary methods for identifying discrete regions of input and for classifying regions as one of intended input and palm input are discussed in more detail, for example in reference to FIG. 2 and herein below. According to some embodiments of the present invention, one or more parameters, e.g. defining location, size, orientation and shape of the identified region of input are determined (block 425) and for each region analysis is performed to determine validity of the output obtained from the identified region of input.

In some exemplary embodiments, for each region that has been classified as a region of intended input (block 435) a query is made to determine if the region overlaps, e.g. partially covered and/or is encompassed, e.g. fully included in a region that is recorded as an invalid region (block 440), e.g. in table 700. In some exemplary embodiments, overlap between a current region and a previously recorded region is determined based on parameters defined for the region, e.g. size, shape, orientation and location.

According to some embodiments of the present invention, a region classified as intended input that does not overlap any invalidated regions, e.g. any invalidated regions listed in table 700 is validated as intended input (block 455) and is reported to the host associated with the digitizer sensor and/or otherwise processed, e.g. tracked. Alternatively, when a region that has been classified as a region of intended input overlaps a presently invalid region, a time stamp for the invalid region is renewed (block 445) and output from the region classified as intended input is invalidated and/or rejected (block 450). Typically rejected output is not reported to the host associated with the digitizer sensor and is defined as unintended input. Optionally, rejected output is reported to the host and is marked as output obtained from the palm and/or other unintended input.

According to some embodiments of the present invention, each region that is not classified as intended input (block 435), e.g. is classified as palm input, is added to the list of palm input regions (block 460) with a time stamp (block 465). Typically, input from a palm input region is invalidated (block 470) and is not reported to the host.

In some exemplary embodiments, each of the regions is examined in an iterative process (blocks 475, 480, 490). Optionally, all regions classified as palm input regions are added to the record of palm input regions, e.g. table 700 without requiring an iterative process.

According to some embodiments of the present invention, over a course of user interaction, a same palm region may be entered into table 700 a plurality of times, in each entry 690 with a different time stamp. Typically, in such cases, output from the region will continue to be invalid until the pre-defined time period for validating output for all instances is lapsed. The present inventor has found that, even when some input regions are mistakenly detected as palm input, the stability of operation of an associated host is improved by filtering out erratic output that appears over a short period, e.g. over a period between 0.005-0.1 seconds, 0.01-0.25 seconds, 0.01-0.5 seconds, or the like. Optionally, applications requiring palm input may neutralize this feature of the digitizer sensor.

Figure 5:
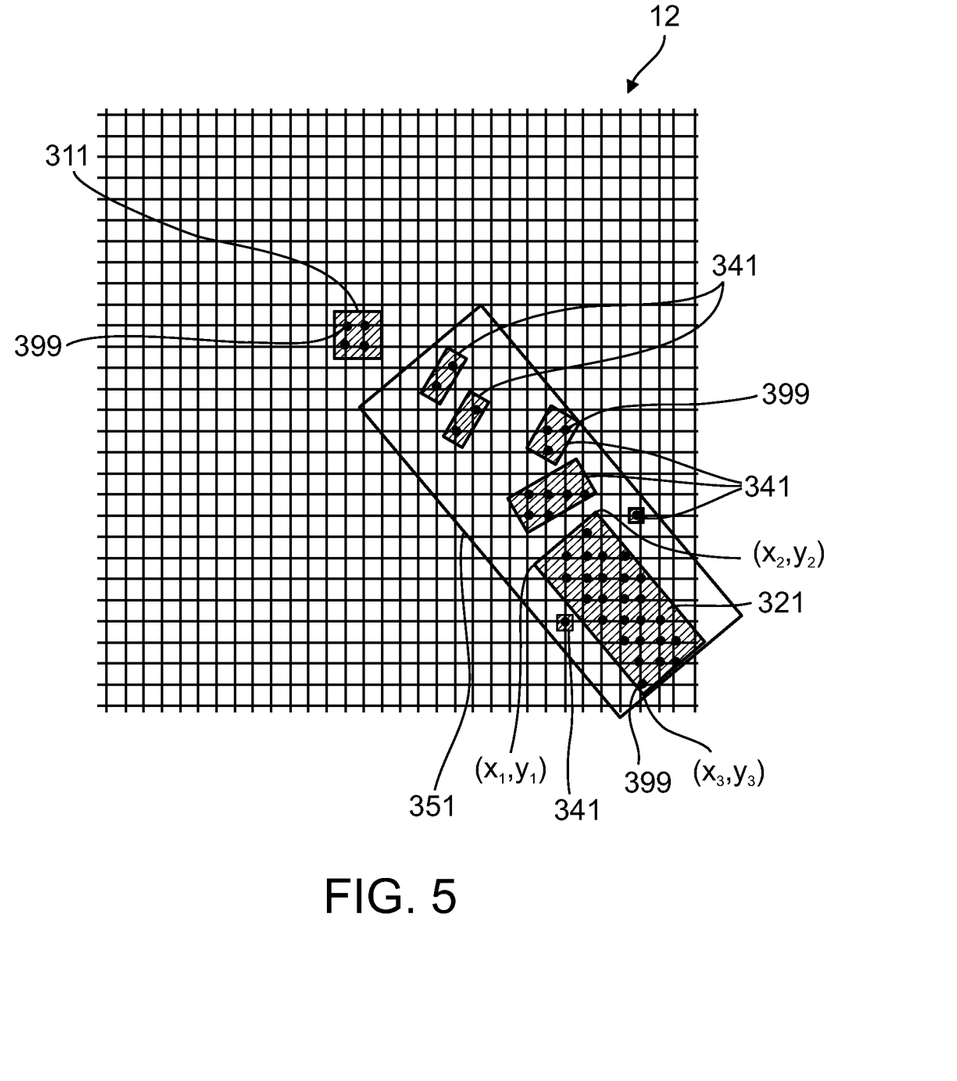
FIG. 5 is a schematic illustration of exemplary output segmented into regions with a pre-defined shape in accordance with some embodiments of the present invention.

Reference is now made to FIG. 5 showing a schematic illustration of exemplary output segmented into regions with a pre-defined shape in accordance with some embodiments of the present invention. Optionally, each region is defined as an area covered by a plurality of contiguous junctions 399 having similar outputs and/or outputs beyond a defined threshold.

In some exemplary embodiments, a pattern of outputs obtained from junctions 399 are segmented into defined regions of input having a pre-defined shape. In some exemplary embodiments, each region is defined by a bounding rectangle fitted around the plurality of contiguous junctions 399 having similar outputs and/or outputs beyond a defined threshold. Alternatively, each region is defined as an ellipse fitted around the plurality of contiguous junctions 399. Exemplary methods that may be used for segmenting a pattern of outputs into defined regions are discussed, for example in incorporated U.S. Patent Application Publication No. 2009-0095540 and incorporated U.S. Patent Application Publication No. 2011-0310040. Typically, the regions bounded by a defined rectangular area include output 311 obtained from a fingertip, e.g. intended input as well as output 351 obtained from a palm, e.g. unintended input. Typically, output 351 from the palm includes one or more large area regions 321 as well as at least one small area region 341. In some exemplary embodiments, a size, orientation, and position of each rectangular area can be determined, by identifying coordinates of two or three out of four of the vertices of the rectangle, e.g. $(x_2, y_2)$ and $(x_3, y_3)$ or $(x_1, y_1)$, $(x_2, y_2)$ and $(x_3, y_3)$.

Figure 6:
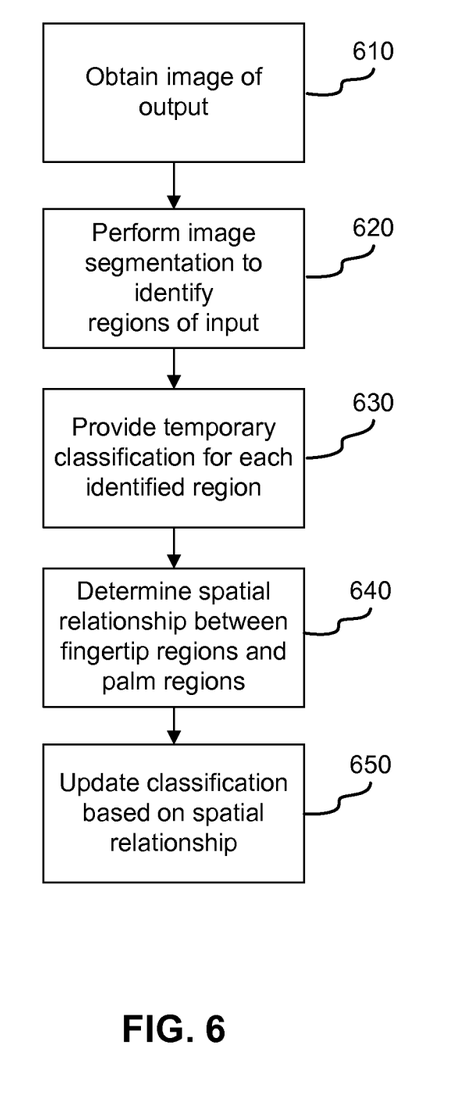
FIG. 6 is an exemplary flow chart of a method for differentiating between fingertip input regions and palm input regions on a multi-touch digitizer sensor that can be used in conjunction with some embodiments of the present invention.

Reference is now made to FIG. 6 showing an exemplary flow chart of a method for differentiating between fingertip input regions and palm input regions on a multi-touch digitizer sensor that can be used in conjunction with some embodiments of the present invention. According to some embodiments of the present invention, output depicting locations of input on a digitizer sensor is obtained. In some exemplary embodiments, a two dimensional image is constructed from the output obtained across the digitizer sensor (block 610). Optionally, each pixel of the image has a value corresponding to output obtained at a location of the pixel, e.g. an amplitude and/or phase. According to some embodiments of the present invention, image segmentation is performed to define discrete regions of input to the digitizer sensor (block 620). Typically, image segmentation methods define a boundary around a region on the image, having similar properties, e.g. similar amplitude values. Typically, each segmented region corresponds to a region of input on the digitizer sensor.

According to some embodiments of the present invention, each segmented region is temporarily classified as either a potential fingertip input region or a palm input region (block 630) based on spatial characteristics of each region, e.g. size, shape, location and/or aspect ratio. According to some exemplary embodiments, segmented regions having a size approximately between 16 $mm^2$-500 $mm^2$ or a size approximately between 16 $mm^2$-1000 $mm^2$ are classified as potential fingertip input regions and larger segmented regions are classified as palm input regions. In some exemplary embodiments, the shape of the potential fingertip touch segment is examined and/or the amplitude output is examined and compared to typical shapes or outputs associated with fingertip touch. In some exemplary embodiments, the shape of the potential fingertip touch segment is determined from the aspect ratio data, e.g. for aspect ratio closer to 1:2 or 1:3, an elliptic shape is determined while for aspect ratio closer to 1:1, a round shape is determined.

According to some embodiments of the present invention, the spatial relationship between each of the potential fingertip touch segments and the palm touch regions is determined (block 640). Typically, palm input regions are surrounded by one or more small area regions that may be mistaken for a fingertip input region. Typically, this small area regions result from artifact signals that typically occur around a large area touch region, e.g. a palm touch region, and/or due to the three dimensional structure of the palm. Optionally, these small area regions can be identified based on their proximity to larger regions of input.

According to some embodiments of the present invention, potential fingertip touch segments that are within a pre-defined vicinity of a classified palm input region are disqualified as real fingertip touch regions and are instead defined as a palm input region, e.g. updated to be palm input regions (block 650). Typically, regions initially defined as palm input regions (block 630) are maintained as palm input regions.

Figure 7:
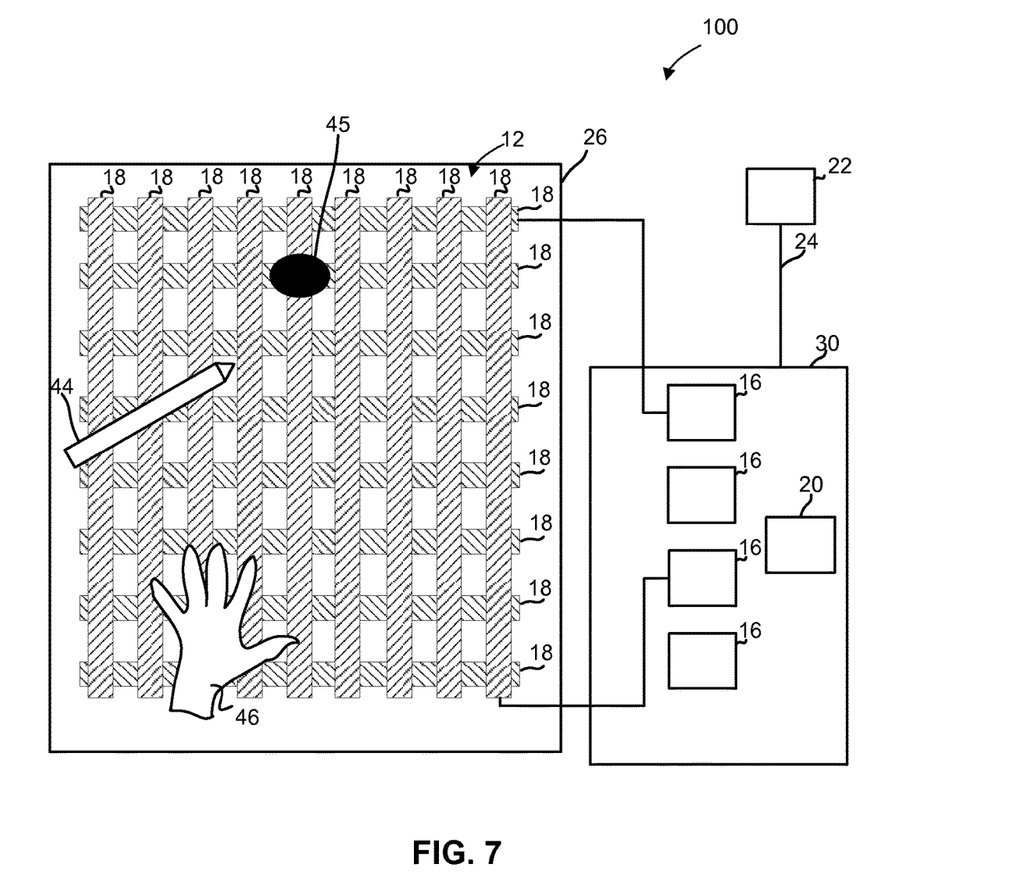
FIG. 7 is an exemplary simplified block diagram of a digitizer system in accordance with some embodiments of the present invention.

Reference is now made to FIG. 7 showing an exemplary simplified block diagram of a digitizer system in accordance with some embodiments of the present invention. The digitizer system 100 may be suitable for any computing device that enables touch and/or hover input between a user and the device, e.g. mobile and/or desktop and/or tabletop computing devices that include, for example, FPD screens. Examples of such devices include Tablet PCs, pen enabled lap-top computers, tabletop computer, PDAs or any hand held devices such as palm pilots and mobile phones or other devices that facilitate electronic gaming. According to some embodiments of the present invention, the digitizer system comprises a sensor 12 including a patterned arrangement of conductive lines, which is optionally transparent, and which is typically overlaid on a FPD. Typically sensor 12 is a grid based sensor including horizontal and vertical conductive lines.

According to some embodiments of the present invention, circuitry is provided on one or more PCB(s) 30 positioned around sensor 12. According to some embodiments of the present invention, one or more ASICs 16 connected to outputs of the various conductive lines in the grid is positioned on PCB(s) 30. Typically, ASICs 16 function to process the received signals at a first processing stage and to sample the sensor's output into a digital representation. The digital output signal is forwarded to a digital unit 20, e.g. digital ASIC unit also on PCB 30, for further digital processing. According to some embodiments of the present invention, digital unit 20 together with ASIC 16 serves as the controller of the digitizer system and/or has functionality of a controller and/or processor. Output from the digitizer sensor is forwarded to a host 22 via an interface 24 for processing by the operating system or any current application.

According to some embodiments of the present invention, digital unit 20 together with ASIC 16 includes memory and/or memory capability. Memory capability may include volatile and/or non-volatile memory, e.g. FLASH memory. In some embodiments of the present invention, the memory unit and/or memory capability, e.g. FLASH memory is a unit separate from the digital unit 20 but in communication with digital unit 20. According to some embodiments of the present invention, one or more tables and/or databases may be stored to record statistical data and/or outputs, e.g. images or patterned outputs of sensor 12, sampled by ASIC 16 and/or calculated by digitizer unit 20. Data and/or signal values may be stored in volatile and nonvolatile memory. According to some embodiments of the present invention, table 700 (FIG. 3) and/or a list of invalid regions detected on sensor 12 is stored in memory included in digital unit 20.

According to some embodiments of the invention, digital unit 20 receives the sampled data from ASIC 16, reads the sampled data, processes it and determines and/or tracks the position of physical objects, such as a stylus 44 and a token 45 and/or a finger 46, and/or an electronic tag touching the digitizer sensor from the received and processed signals. According to some embodiments of the present invention, digital unit 20 determines the presence and/or absence of physical objects, such as stylus 44, and/or finger 46 over time. In some exemplary embodiments of the present invention hovering of an object, e.g. stylus 44, finger 46 and hand, is also detected and processed by digital unit 20. Calculated position and/or tracking information are reported to the host computer via interface 24.

Stylus Detection and Tracking

According to some embodiments of the invention, digital unit 20 produces and controls the timing and sending of a triggering pulse to be provided to an excitation coil 26 that surrounds the sensor arrangement and the display screen. The excitation coil provides a trigger pulse in the form of an electric or electromagnetic field that excites passive circuitry in stylus 44 or other object used for user touch to produce a response from the stylus that can subsequently be detected. According to some embodiments of the present invention, stylus 44 is an active stylus that does not require excitation from an external source. In some exemplary embodiments, stylus detection and tracking is not included and the digitizer sensor only functions as a capacitive sensor to detect the presence of fingertips, body parts and conductive objects, e.g. tokens.

Fingertip Detection and Tracking

According to some embodiments, digital unit 20 produces and sends a triggering pulse to at least one of the conductive lines. Typically the triggering pulses and/or signals are analog pulses and/or signals. According to some embodiments of the present invention, the triggering pulse and/or signal implemented may be confined to one or more pre-defined frequencies, e.g. 18 KHz or 20-40 KHz. In some exemplary embodiments, finger touch detection is facilitated when sending a triggering pulse to the conductive lines. Typically at each junction, e.g. junction 40 in sensor 12 a certain capacitance exists between orthogonal conductive lines so that a trigger pulse that includes an oscillating signal is transferred by virtue of capacitance to a conductive line with which a junction is formed. Typically, the presence of a finger decreases the coupled signal by 15-20% or 15-30% since the finger typically drains current from the lines to ground. In some exemplary embodiments, amplitude of the signal within a bandwidth of 18-40 KHz is examined to detect fingertip touch. This method is able to detect more than one finger touch and/or capacitive object at the same time (multi-touch). This method further enables calculating touch area. Typically, junctions of the sensor are interrogated by sequentially transmitting a triggering signal to each of a set of parallel conductive lines of the digitizer sensor and sampling output from each conductive line orthogonal to that set. Typically, the output signals from the orthogonal conductive lines are sampled simultaneously.

Token Detection and Tracking

In some exemplary embodiments of the invention, the apparatus is further capable of detecting and tracking a position of one or more physical objects 45 including one or more small conductive elements placed on a surface object in contact with the digitizer surface, e.g. tokens. In some exemplary embodiments, detection of tokens is performed in a similar manner to fingertip detection. In an exemplary embodiment, an AC signal 60 is applied to one or more parallel conductive lines in the two-dimensional sensor matrix 12 and output is sampled on the orthogonal lines to detect a coupled signal (FIG. 2). Typically in response to a token positioned over and/or near a junction between two orthogonal conductive lines, a coupled signal at the junction is increased by about 5-10%, apparently by increasing the capacitive coupling between activated and passive conductive line. Preferably, the object comprises a geometric arrangement of tokens that is used to identify the physical object.

It is noted that although most of the embodiments of the present invention refer to unintended palm input, the methods and systems described herein can similarly be applied to unintended input obtained from other parts of a body, e.g. arm, elbow, ear, leg and/or obtained from other objects, e.g. conductive objects overlaid on a sensing surface of a digitizer and/or touch screen.

The present invention is not limited to the technical description of the digitizer system described herein. Digitizer systems used to detect stylus and/or fingertip location may be, for example, similar to digitizer systems described in incorporated U.S. Pat. No. 6,690,156, U.S. Patent Application Publication No. 20040095333 and/or U.S. Patent Application Publication No. 20040155871. It will also be applicable to other digitized systems and touch screens known in the art, depending on their construction, especially to systems capable of multi-touch detection.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method comprising:
   sampling outputs on a capacitive based digitizer sensor over a first refresh cycle;
   identifying based on the outputs sampled over the first refresh cycle, a first region on the digitizer sensor that is receiving input that was unintended, wherein the input is identified as unintended based on at least one of size and shape of the first region;
   recording and initializing a time stamp and a location of the first region, wherein the time stamp is configured to indicate a time at which the unintended input is identified;
   adding the location of the first region to a list of locations of regions classified as unintended input regions, wherein each entry of the list is stored with the time stamp for a pre-defined time period after initializing or re-initializing the time stamp and then subsequently removed from the list after the pre-defined time period;
   sampling outputs on the capacitive based digitizer sensor over subsequent refresh cycles;
   identifying based on the outputs sampled over any one of the subsequent refresh cycles, a second region on the digitizer sensor receiving input that was intended, wherein the input that was intended is identified based on at least one of size and shape of the second region and wherein the second region is different than the first region in at least one of size and shape;
   disqualifying the second region as input that was intended based on the second region spatially overlapping the location of the first region and based on the second region being identified within the pre-define time period after the time stamp;
   re-initializing the time stamp on the first region based on the disqualifying of the second region; and
   reporting the second region as intended input to a host associated with the digitizer sensor based on the second region not being disqualified.

2. The method of claim 1, wherein the unintended input is input from at least one of a palm, hand, wrist, ear and knuckle.

3. The method of claim 1, wherein a plurality of regions of input to the digitizer sensor is identified by segmenting the outputs obtained from the digitizer sensor into a plurality of discrete regions.

4. The method of claim 1, wherein each of the first region and the second region is defined as a rectangular region.

5. The method of claim 1, wherein each entry on the list includes at least one parameter defining a spatial extent of a region listed.

6. The method of claim 1, wherein the pre-defined time period is between 0.25 seconds and 2 seconds.

7. The method of claim 1, wherein the first region is identified based on the region encompassing an area larger than 500 mm$^2$.

8. The method of claim 1, wherein the first region is identified based on the region encompassing an area larger than 1000 mm$^2$.

9. A method of claim 1, wherein the intended input is input from a fingertip.

10. A digitizer system comprising:
    a digitizer sensor comprising:
       a grid based capacitive sensor configured to detect presence of a plurality of capacitive objects positioned over the sensor;
    a processing unit configured to:
       sample outputs on a capacitive based digitizer sensor over a first refresh cycle;
       identify based on the outputs, a first region on the digitizer sensor that is receiving input that was unintended, wherein the input is identified as unintended based on at least one of size and shape of the first region; and
       record and initialize a time stamp and a location of the first region, wherein the time stamp is configured to indicate a time at which the unintended input is identified;
       add the location of the first region to a list of locations of regions classified as unintended input regions, wherein each entry of the list is stored with the time stamp for a pre-defined time period after initializing or re-initializing the time stamp and then subsequently removed from the list after the pre-defined time period;
       sample outputs on the capacitive based digitizer sensor over subsequent refresh cycles;

identify based on the outputs over any one of the subsequent refresh cycles, a second region on the digitizer sensor that is receiving input that was intended, wherein the input that was intended is identified based on at least one of size and shape of the second region and wherein the second region is different than the first region in at least one of size and shape; and a controller configured to:
    disqualify the second region as input that was intended based on the second region spatially overlapping the location of the first region and based on the second region being identified within flail the pre-define time period after the time stamp;
    wherein the processing unit is configured to re-initialize the time stamp on the first region based on the second region being disqualified; and
    report the second region as intended input to a host associated with the digitizer system based on the second region not being disqualified.

11. The digitizer system of claim 10, wherein the unintended input is input from at least one of a palm, hand, wrist, ear, and knuckle.

12. The digitizer system of claim 10, wherein the processing unit is configured to define each of the first region and the second region as a rectangular region.

13. The digitizer system of claim 10, wherein the intended input is input from a fingertip.

14. The digitizer system of claim 10, wherein the processing unit is configured to segment the outputs obtained from the digitizer sensor into a plurality of discrete regions and to classify each of the plurality as one of intended or unintended input.

15. The digitizer system of claim 10, wherein the processing unit is configured to store at least one parameter defining a spatial extent for each of the regions on the list.

* * * * *